(12) United States Patent
Ryu et al.

(10) Patent No.: US 7,746,775 B2
(45) Date of Patent: Jun. 29, 2010

(54) INSTANT SERVICE METHOD FOR DEFICIT-ROUND-ROBIN (DRR) DATA PACKET SCHEDULING

(75) Inventors: Hyun-surk Ryu, Suwon-si (KR); Ji-noo Joung, Yongin-si (KR); Fei-fei Feng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 11/649,789

(22) Filed: Jan. 5, 2007

(65) Prior Publication Data

US 2007/0291645 A1    Dec. 20, 2007

(30) Foreign Application Priority Data

Jan. 5, 2006    (KR) .................... 10-2006-0001496

(51) Int. Cl.
*H04L 12/28*    (2006.01)
*G01R 31/08*    (2006.01)

(52) U.S. Cl. .................... 370/230; 370/235; 370/395.4

(58) Field of Classification Search .................... None
See application file for complete search history.

(56) References Cited

U.S. PATENT DOCUMENTS

| | | | |
|---|---|---|---|
| 2003/0169743 A1* | 9/2003 | Chiussi et al. | 370/395.4 |
| 2003/0231590 A1* | 12/2003 | Zhao et al. | 370/230.1 |
| 2004/0179542 A1* | 9/2004 | Murakami et al. | 370/413 |
| 2005/0175014 A1* | 8/2005 | Patrick | 370/395.43 |

OTHER PUBLICATIONS

Jinoo Joung et al., Instant Service Policy and Its Application to Deficit Round Robin, pp. 1-12, Seoul, Korea.

* cited by examiner

*Primary Examiner*—Seema S Rao
*Assistant Examiner*—Christine Duong
(74) *Attorney, Agent, or Firm*—Sughrue Mion, PLLC

(57) ABSTRACT

An instant service method and apparatus for deficit-round-robin (DRR) data packet scheduling are provided. The method includes servicing a current flow according to packet scheduling; activating a new flow according to an input of a new data packet; servicing the new flow immediately when the current flow service is completed; and servicing a next flow when the new flow service is completed. The apparatus includes a packet memory; a flow information storage; an active list processor; a main controller; and an output part.

11 Claims, 4 Drawing Sheets

NEW FLOW

INSTANT SERVICE METHOD FOR DEFICIT-ROUND-ROBIN (DRR) DATA PACKET SCHEDULING

CROSS-REFERENCE TO RELATED APPLICATIONS

This application claims priority from Korean Patent Application No. 10-2006-0001496 filed on Jan. 5, 2006 in the Korean Intellectual Property Office, the entire disclosure of which is incorporated herein by reference.

BACKGROUND OF THE INVENTION

1. Field of the Invention

Methods and apparatuses consistent with the present invention generally relate to flow service for data packet scheduling, and more particularly, to instant service for deficit-round-robin (DRR) data packet scheduling which is applied to a packet switching network, in which, when a new flow is activated within a service time of a current flow, the new flow is serviced immediately after the service time termination of the current flow and a next flow is serviced according to the flow scheduling.

2. Description of the Related Art

In general, service bandwidths are reserved with respect to a unit of traffic which is called a flow in a packet switching network where data packets are transmitted and received. To guarantee the reserved service bandwidth, the packet switching network applies the bandwidth accurately assigned, to the traffic of a specific flow using a scheduling algorithm. An example of the scheduling algorithm is a deficit round robin (DRR).

The DRR services the active flows in a round-robin manner. For instance, a packet switching device stores each flow of incoming data packets, and a scheduler services the flows in sequence according to the packet scheduling. The packet switching device reads out the data packets in each flow to be serviced from a memory and queues the read data packets. In doing so, a size of the packets to be serviced is compared with a predefined quantum for each flow. When the packet size is smaller than the quantum, the packets are serviced. Next, the packet size is subtracted from the quantum and the resultant value is stored as a deficit counter value. By contrast, when the packet size is greater than the quantum, packets are not serviced but may be serviced in the next round. In the next round, the size of the packets to be serviced is again compared with a summation of a distributed control (DC) value and the quantum value for each flow. When the packet size is smaller than the summation of the DC value and the quantum value, the packets are serviced. When the packet size is greater than the summation of the DC value and the quantum value, the packets are carried forward to the next round.

When servicing the data packets by flows in the DRR, a controller controls the output from an output port according to linked list information stored in a register. The linked list information includes information relating to a header flow, information relating to a tail flow, information relating to service order links between flows, and the like. For instance, as shown in FIG. 1, when a flow 101, a flow 102, a flow 103, a flow 104, and a flow 105 are serviced in sequence from an output of an output port, the flow 101 is designated to the header flow and the flow 105 is designated to the tail flow. The flow 101 is linked to the flow 102 as the next turn, and the flow 102 is linked to the flow 103 as the next turn. The flow 103 is linked to the flow 104 as the next turn, and the flow 104 is linked to the flow 105 as the next turn. The flow 105, which is the tail flow, is linked to the flow 101 being the header flow. The linked list information includes such information, and the controller controls the outputting from the output of the output port according to the linked list information.

In case that a new data packet is input to the packet switching device and a new flow 106 is activated accordingly, the controller designates the new flow 106 to the tail flow and adds it to the linked list information. According to the linked list information, the flow 101, the flow 102, the flow 103, the flow 104, and the flow 105 are serviced in order, and then the new flow 106 is serviced. However, disadvantageously, maximum latency is raised because, if at the moment the flow is activated the flow 101 was being served, the time the flow 106 has to wait for service is unnecessarily large. In this case it can be considered that the penalty is given to the new flow 106 until the other flows are serviced. Thus, the quality of service (QoS) is reduced in the multimedia transmission in the packet switching network.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an instant service method for deficit round robin (DRR) data packet scheduling which is applied to a packet switching network, in which, when a new flow is activated within a service time of a current flow, the new flow is serviced immediately after the service time termination of the current flow and a next flow is serviced according to the flow scheduling.

According to an aspect of the present invention, an instant service method of a DRR data packet scheduling includes a current flow service operation of servicing a current flow according to packet scheduling; a new flow activation operation of activating a new flow according to an input of a new data packet; a new flow service operation of servicing the new flow immediately when the current flow service is completed; and a next flow service operation of servicing a next flow when the new flow service is completed.

The current flow service operation, the new flow service operation, and the next flow service operation may be carried out in reference to information relating to the corresponding flows stored in a flow information storage.

The information relating to the flow may include information relating to a flow identification (ID), a flag, quanta value, a deficit value, an initial packet pointer, and a next flow pointer.

The current flow service operation, the new flow service operation, and the next flow service operation may transmit corresponding data packets which include the information relating to a current packet pointer, a current flow pointer, quanta value, a deficit value, and a current packet size.

The new flow activation operation may store the new data packet to the packet memory and add the new data packet in a queue to service the new flow.

The next flow service operation may service the next flow excluding a deactivated flow when there is the deactivated flow in the next flow.

The next flow may be serviced based on an active list relating to an activated flow and the deactivate flow.

The current flow service operation, the new flow activation operation, the new flow service operation, and the next flow service operation may be applied orthogonally to other improvements applicable to DRR.

According to another aspect of the present invention, there is provided a packet scheduler which includes means for servicing a current flow according to packet scheduling; means for activating a new flow according to an input of a new data packet; means for servicing the new flow immediately when the current flow service is completed; and means for servicing a next flow when the new flow service is completed.

According to another aspect of the present invention, a packet scheduler is provided which includes a packet memory which stores data packets; a flow information storage which retains information relating to the data packets according to flows; an active list processor which stores an active list relating to active flows and deactivated flows, and performs flow servicing according to the active list based on information in the flow information storage; a main controller which stores information relating to a new flow to the flow information storage as a next service turn, and when a current service of a first flow is completed, controls the active list processor to service the new flow; and an output part which buffers the data packet from the main controller and outputs the data packet.

BRIEF DESCRIPTION OF THE DRAWING FIGURES

These and other aspects of the present invention will become more apparent and more readily appreciated from the following description of exemplary embodiments thereof, with reference to the accompanying drawings, in which.

DETAILED DESCRIPTION OF EXEMPLARY EMBODIMENTS OF THE PRESENT INVENTION

Figure 1:
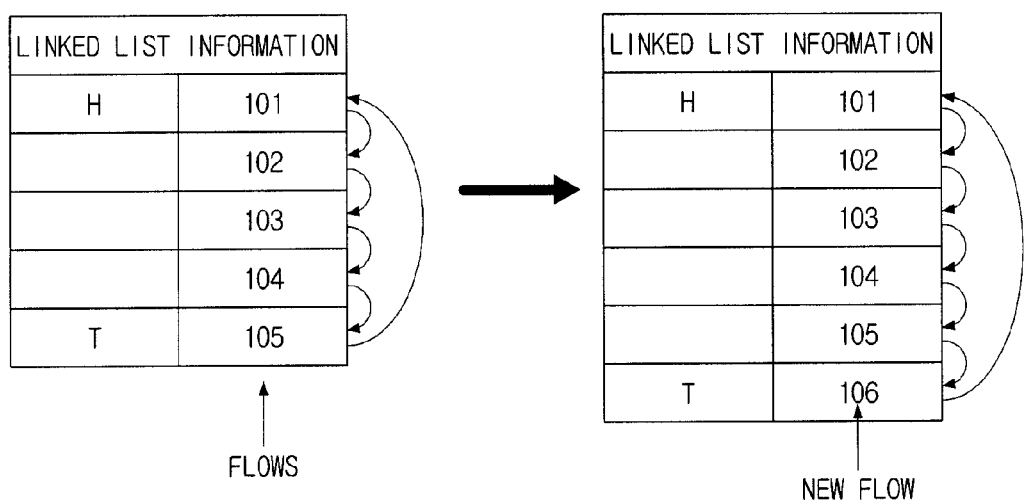
FIG. 1 is a diagram illustrating a DRR flow scheduling of the related art.

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

Figure 2:
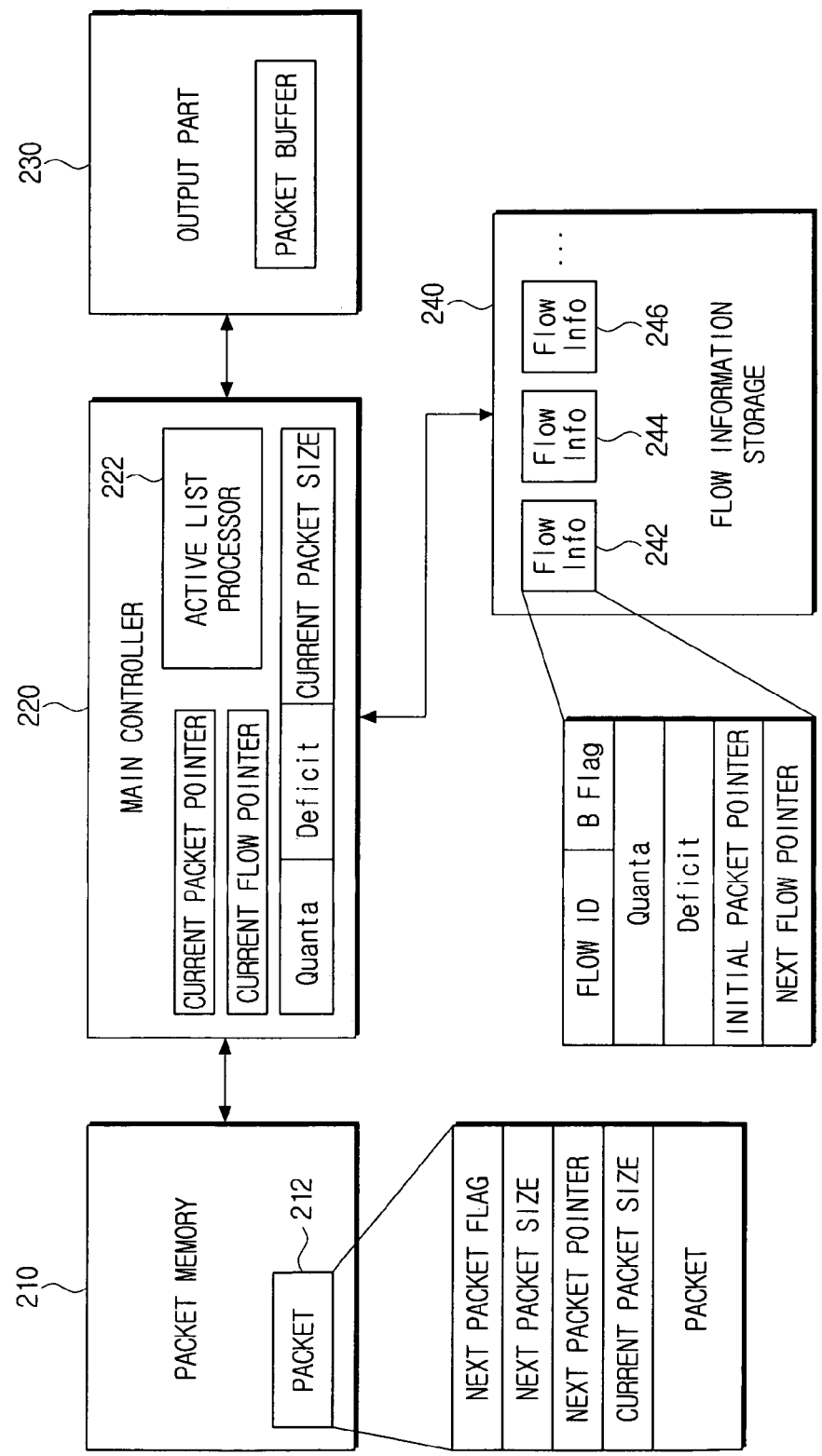
FIG. 2 is a simplified diagram illustrating a packet scheduler according to an exemplary embodiment of the present invention.

FIG. 2 is a simplified diagram illustrating a packet scheduler according to an exemplary embodiment of the present invention.

According to an exemplary embodiment of the present invention, the packet scheduler includes a packet memory 210, a main controller 220, a active list processor 222, an output part 230, and a flow information storage 240.

The packet memory 210 stores data packets input from the outside the packet scheduler. For instance, the packet memory 210 may employ a static random access memory (SRAM) of mass storage. As shown in FIG. 2, the data packet stored in the packet memory 210 includes a next packet flag, a next packet size, a next packet pointer, a current packet size, and a packet (i.e., the packet data).

When a new flow is input and backlogged while the first flow is being serviced, the main controller 220 stores information relating to the new flow to the flow information storage 240 as the next service turn. When the current service of the first flow is completed, the main controller 220 controls the active list processor 222 to service the new flow. After the completion of the new flow service, the main controller 220 services the second flow. Subsequently, the main controller 220 services the next flows of the third flow, the forth flow, and so forth.

When servicing the first flow, the main controller 220 reads out first flow information including a current packet pointer, a current flow pointer, quanta value, a deficit value, and a current packet size; forms the first flow information into a data packet to be serviced; and provides the data packet to the output part 230.

The output part 230 buffers the data packet received from the main controller 220 in a packet buffer and outputs the data packet to a destination.

The active list processor 222 services an active flow of the plurality of flows according to the flow information, but does not service a deactivated flow. The active list processor 222 holds an active list relating to the active flows and the deactivated flows, and performs the flow servicing according to the active list based on the flow information.

The flow information storage 240 retains information relating to data packets according to the flows. In specific, the flow information storage 240 stores first flow information 242, second flow information 244, third flow information 246, and so forth. While only first through third flow information 242, 244, and 246 are shown, it will be appreciated at any number of flow information may be stored. The flow information includes a flow identification (ID), a flag, quanta value, a deficit value, an initial packet pointer, a next flow pointer, and the like.

Figure 3:
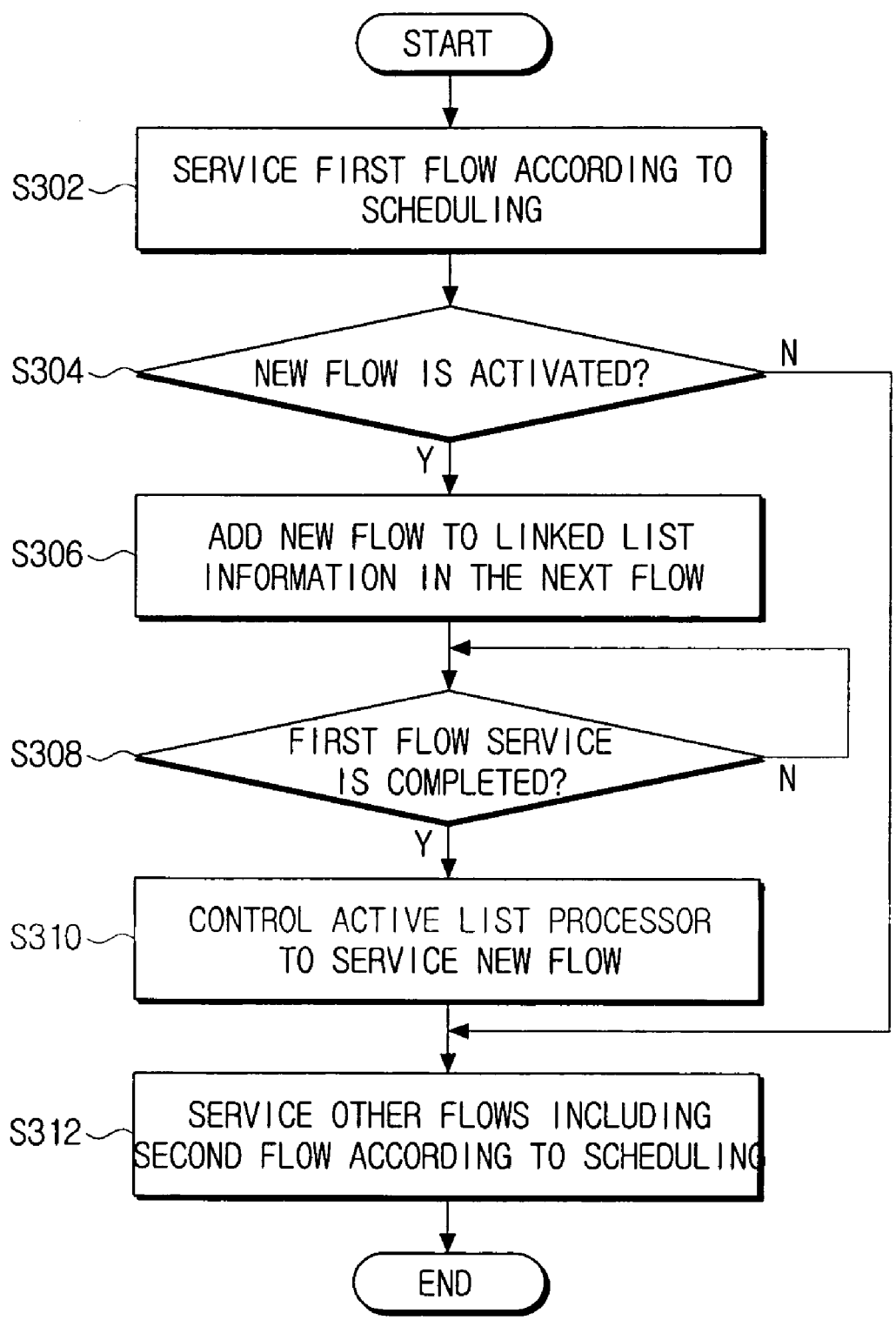
FIG. 3 is flowchart outlining an instant service method of the DRR data packet scheduling according to an exemplary embodiment of the present invention.

FIG. 3 is flowchart outlining an instant service method of the DRR data packet scheduling according to an exemplary embodiment of the present invention.

The instant service method of the DRR data packet scheduling can be applied to voice and telephony over ATM (VTOA) used in a mobile communication system, and to a home network system for controlling a home appliance in the house.

In the DRR, a quantity given to one round is referred to as a quantum. The quantum can be set to be less than the maximum packet size. The DRR services a round pointer designating a data packet to be serviced by the size of one quantum at its turn. Several packets of a size smaller than the quantum are serviced, and packets of a size larger than the quantum are serviced with summation of quantum of the next round until a counter value becomes equal to or greater than the packet size. Since the quantum size represents a quantity to be serviced in one round for each link, it is possible to provide different rates for each link. That is, if a high rate link sets a large quantum size and a low rate link sets a small quantum, the service can be offered with a rate in proportion to the quantum.

Referring to FIG. 3, the packet scheduler according to an exemplary embodiment of the present invention, services the flows according to the scheduling. The packet memory 210 retains the plurality of packet data according to the flows, which are input from the outside to be transmitted to destination. In case of the data packet to be transmitted to the destination, the corresponding flow is considered to be active and the main controller 220 stores the information relating to the respective flows to the flow information storage 240 according to the scheduling. The scheduling will now be described with reference to FIG. 3.

Figure 4:
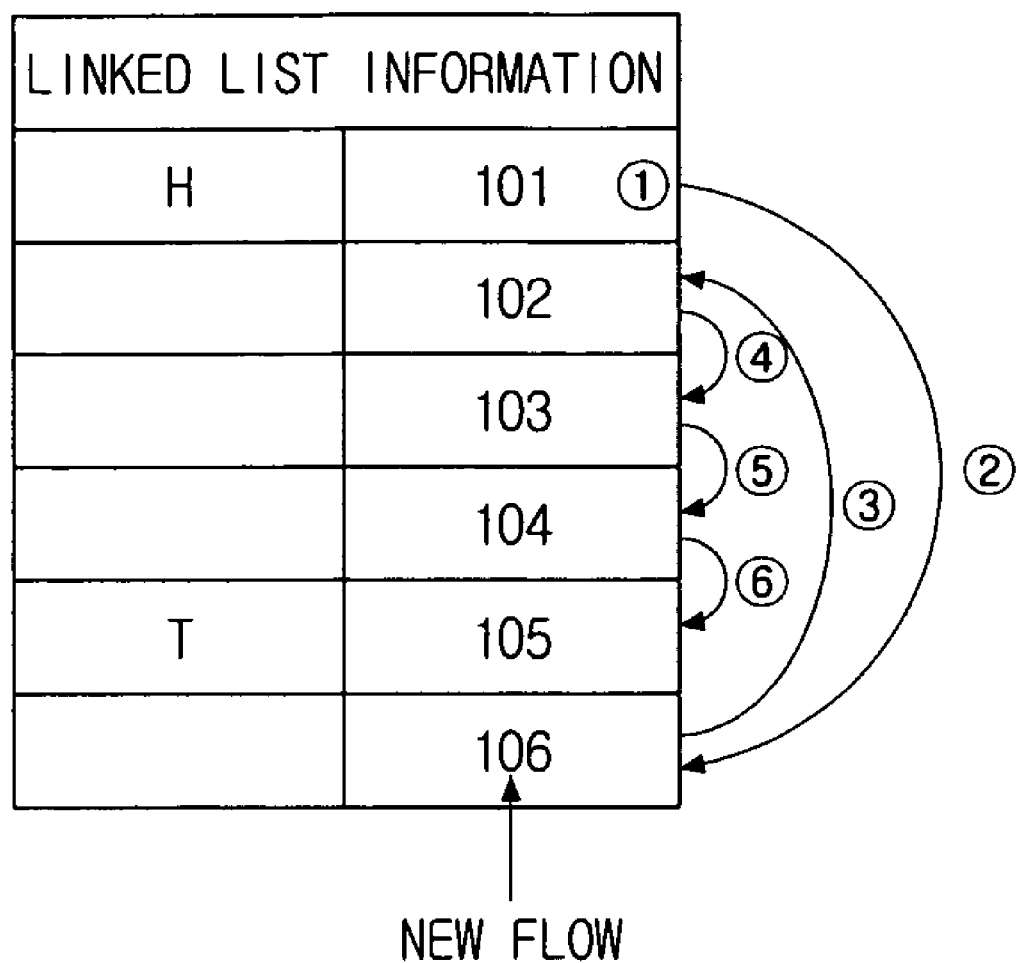
FIG. 4 is a diagram illustrating the flow servicing order according to an exemplary embodiment of the present invention.

First, the main controller 220 reads the data packet corresponding to the first flow from the packet memory 210 and adds it to the queue. Next, the main controller 220 forwards the data packet corresponding to the first flow to the output part 230 via the active list processor 222 according to the scheduling, to thus service the first flow (S302). Referring to FIG. 4, the main controller 220 first services the flow 101 corresponding to the first flow, as indicated by ①.

In doing so, when a new data packet is input to the packet scheduler from the outside and stored to the packet memory 210, the main controller 220 determines whether the new flow is activated or backlogged (S304).

If the main controller 220 determines that the new flow, for example, the flow 106 in FIG. 4 is activated while servicing the flow 101 being the first flow, the main controller 220 adds the new flow to the linked list information which is stored in a certain area of the packet memory 210, as the next flow (S306).

Next, the main controller 220 stores information relating to the new flow 106 to the flow information storage 240. In more detail, the main controller 220 stores the information relating to the flow ID, the flag, the quanta value, the deficit value, the initial packet pointer, and the next flow pointer of the new flow. At this time, the next flow pointer is the second flow.

Meanwhile, the packet scheduler services the data packets in the queue according to first-in first-out (FIFO) manner in relation with the flows. Scheduling information relating to head of line (HOL) of the flows is stored in the queue one by one. Upon receiving the packet, the packet scheduler confirms whether it is the HOL packet of the flow. When the received packet is the HOL packet, the scheduling information is stored in the queue. The quantum size is assigned to the queue. The scheduling information relating to the data packet which is smaller than the counter value with the quantum size taken account is stored in the queue being currently serviced, while the scheduling information relating to the packet greater than the packet counter value is stored in other queue. The scheduling queue being serviced is continuously serviced until it is completely empty. When there is no backlogged scheduling information in the queue, the other queue is serviced. At this time, a new round begins. The new round services the flows in the same manner.

As such, when it is determined that the servicing of the first flow 101 is completed (S308), the main controller 220 controls the active list processor 222 to service the new flow 106 at the next turn, in reference to the flow information based on the linked list information (S310). Hence, subsequent to the flow 101, the new flow 106 is serviced as indicated by ② in FIG. 4.

In specific, the main controller 220 reads the data packet corresponding to the new flow from the packet memory 210 and adds it to the queue. The active list processor 222 retrieves the flow information from the flow information storage 240 and reads out the information relating to the new flow designated to the next flow pointer of the first flow. Next, the active list processor 220 forwards the data packet corresponding to the new flow among the data packets in the queue to the output part 230. The output part 230 outputs the data packet corresponding to the new flow to the destination.

Upon the service completion of the new flow, the main controller 220 controls the active list processor 222 to service the second flow in reference to the next flow pointer of the information relating to the new flow (S312). Thus, subsequent to the second flow 106, the third flow 102 is serviced as indicated by ③ in FIG. 4.

According to the scheduling, the main controller 220 services the fourth flow 103 following the third flow 102, as indicated by ④. Upon the service completion of the fourth flow 103, the main controller 220 controls to service the flow 104 and the flow 105 in order, as indicated by ⑤ and ⑥, respectively.

In doing so, if the fourth flow 103 is deactivated, the main controller 220 controls to service the fifth flow 104 following the third flow 102. After the fifth flow 104, the sixth flow 105 through the n-th flow are serviced.

One skilled in the art will understand that the instant service method according to the DRR principle can be applied orthogonally to other improvements applicable to DRR.

As set forth above, while the service quantities reserved for the existing active flows are guaranteed, the data packet closest to the activation time point of the new activate flow is serviced. Accordingly, the transmission delay of the data packets can be minimized. Therefore, the QoS of the multimedia transmission in the packet switching network can be enhanced.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An instant service method for servicing packets in deficit-round-robin (DRR) data packet scheduling, the method comprising:
   servicing a current flow according to packet scheduling of a current round;
   activating a new flow according to an input of a new data packet;
   if the current flow is not the last flow scheduled to be serviced in the current round, servicing the new flow immediately when the current flow service is completed; and
   servicing a next flow after the new flow service is completed,
   wherein each of the servicing the current flow, the servicing the new flow, and the servicing the next flow comprises:
      reading out information relating to a current packet pointer, a current flow pointer, a quanta value, a deficit value, and a current packet size of the flow to be serviced from a flow information storage;
      if the current packet size is smaller than or equal to a sum of the quanta value and the deficit value, forming and providing a corresponding data packet to be serviced; and
      if the current packet size is larger than the sum of the quanta value and the deficit value, storing the sum of the quanta value and the deficit value as a new deficit value, and servicing the flow on a next round, and
   wherein at least one of the servicing the current flow, the activating the new flow, the servicing the new flow, and the servicing the next flow, is performed by a tangible controller.

2. The instant service method as in claim 1, wherein the information stored in the flow information storage relates to the current flow, the new flow and the next flow.

3. The instant service method as in claim 1, wherein the information comprises information relating to at least one of a flow identification (ID), a flag, an initial packet pointer, and a next flow pointer.

4. The instant service method as in claim 1, wherein the activating the new flow comprises:
   storing the new data packet in a packet memory; and
   adding the new data packet in a queue to service the new flow.

5. The instant service method as in claim 1, wherein the servicing the next flow comprises servicing the next flow except for a deactivated flow if the deactivated flow is in the next flow.

6. The instant service method as in claim 5, wherein the next flow is serviced based on an active list relating to an activated flow and the deactivated flow.

7. A packet scheduler comprising:
   means for servicing a current flow according to packet scheduling of a current round;
   means for activating a new flow according to an input of a new data packet;
   means for servicing the new flow immediately when the current flow service is completed, if the current flow is not a last flow scheduled to be serviced in the current round; and
   means for servicing a next flow after the new flow service is completed,
   wherein each of the means for servicing the current flow, the means for servicing the new flow, and the means for servicing the next flow reads out information relating to a current packet pointer, a current flow pointer, a quanta value, a deficit value, and a current packet size of the flow to be serviced from a flow information storage,
   wherein if the current packet size is smaller than or equal to a sum of the quanta value and the deficit value, each of the means for servicing the current flow, the means for servicing the new flow, and the means for servicing the next flow forms and provides a corresponding data packet to be serviced, and
   wherein if the current packet size is larger than the sum of the quanta value and the deficit value, each of the means for servicing the current flow, the means for servicing the new flow, and the means for servicing the next flow stores the sum of the quanta value and the deficit value as a new deficit value, and services the flow on a next round.

8. A packet scheduler comprising:
   a packet memory which stores data packets;
   a flow information storage which retains information relating to the data packets according to flows;
   an active list processor which stores an active list relating to active flows and deactivated flows, and performs flow servicing according to the active list based on information in the flow information storage;
   a main controller which, if a current flow to be serviced is not a last flow scheduled to be serviced in a current round of servicing flows according to the active list, stores information relating to a new flow to the flow information storage as a next service turn, and when the current flow is serviced, controls the active list processor to service the new flow; and
   an output part which buffers the data packet from the main controller and outputs the data packet,
   wherein the main controller reads out information relating to a current packet pointer, a current flow pointer, a quanta value, a deficit value and a current packet size of the flow to be serviced from the flow information storage,
   wherein if the current packet size is smaller than or equal to the sum of the quanta value and the deficit value, the main controller forms and provides a corresponding data packet to the output part, and
   wherein if the current packet size is larger than the sum of the quanta value and the deficit value, the main controller stores the sum of the quanta value and the deficit value as a new deficit value, and services the flow on a next round.

9. The packet scheduler as in claim 8, wherein the data packet comprises a next packet flag, a next packet size, a next packet pointer, a current packet size, and data.

10. The packet scheduler as in claim 8, wherein the information relating to the data packets according to flows comprises information relating to at least one of a flow identification (ID), a flag, an initial packet pointer, and a next flow pointer.

11. The packet scheduler as in claim 8, wherein the main controller does not control the active list processor to service the new flow if the new flow is a deactivated flow.

* * * * *